United States Patent
Lee et al.

(10) Patent No.: US 9,791,158 B2
(45) Date of Patent: Oct. 17, 2017

(54) ELECTRIC DUST COLLECTING DEVICE AND AIR CONDITIONER HAVING THE SAME

(71) Applicant: LG ELECTRONICS INC., Seoul (KR)

(72) Inventors: Yanghwa Lee, Seoul (KR); Seungjae Baeck, Seoul (KR); Jihye Ahn, Seoul (KR); Okchun Hyun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 109 days.

(21) Appl. No.: 14/750,601

(22) Filed: Jun. 25, 2015

(65) Prior Publication Data
US 2015/0377500 A1 Dec. 31, 2015

(30) Foreign Application Priority Data
Jun. 26, 2014 (KR) .................. 10-2014-0079208

(51) Int. Cl.
*B03C 3/41* (2006.01)
*F24F 3/16* (2006.01)
(Continued)

(52) U.S. Cl.
CPC .............. *F24F 3/166* (2013.01); *B03C 3/017* (2013.01); *B03C 3/02* (2013.01); *B03C 3/08* (2013.01); *B03C 3/09* (2013.01); *B03C 3/12* (2013.01); *B03C 3/32* (2013.01); *B03C 3/368* (2013.01); *B03C 3/41* (2013.01); *B03C 3/47* (2013.01); *B01D 46/10* (2013.01); *B01D 46/50* (2013.01); *F24F 2003/1635* (2013.01); *F24F 2003/1682* (2013.01)

(58) Field of Classification Search
CPC combination set(s) only.
See application file for complete search history.

(56) References Cited

U.S. PATENT DOCUMENTS

| 3,891,415 A | 6/1975 | Watanabe |
| 4,689,056 A * | 8/1987 | Noguchi .................. B03C 3/12 96/79 |

(Continued)

FOREIGN PATENT DOCUMENTS

| CN | 1091659 C | 10/2002 |
| CN | 1385215 A | 12/2002 |

(Continued)

*Primary Examiner* — Duane Smith
*Assistant Examiner* — Sonji Turner
(74) *Attorney, Agent, or Firm* — Dentons US LLP

(57) ABSTRACT

An electric dust collecting device and an air conditioner having the same are disclosed. The electric dust collecting device includes a first filter unit including a plurality of discharge electrode plates which are spaced apart from each other and have spaces defined therebetween, a high voltage generator electrically connected to all of the plurality of discharge electrode plates, and a second filter unit disposed downstream of the first filter unit in an air flow direction and connected to a ground to cause corona discharge between the discharge electrode plates and the second filter unit, whereby particles electrically charged by corona discharge are collected at the second filter unit. The first filter unit has a simplified structure, and cleaning effect is improved.

19 Claims, 9 Drawing Sheets

(51) Int. Cl.
*B03C 3/08* (2006.01)
*B03C 3/12* (2006.01)
*B03C 3/47* (2006.01)
*B03C 3/02* (2006.01)
*B03C 3/017* (2006.01)
*B03C 3/09* (2006.01)
*B03C 3/32* (2006.01)
*B03C 3/36* (2006.01)
*B01D 46/10* (2006.01)
*B01D 46/50* (2006.01)

(56) References Cited

U.S. PATENT DOCUMENTS

| | | | | |
|---|---|---|---|---|
| 5,766,318 | A * | 6/1998 | Loreth | B03C 3/60 96/69 |
| 7,381,381 | B2 * | 6/2008 | Lee | A61L 9/015 422/186.04 |
| 2003/0005824 | A1 * | 1/2003 | Katou | B03C 3/12 96/35 |
| 2009/0053113 | A1 * | 2/2009 | Mai | A61L 9/22 422/121 |
| 2011/0139009 | A1 | 6/2011 | Nakahara et al. | |

FOREIGN PATENT DOCUMENTS

| | | | | |
|---|---|---|---|---|
| KR | 100724556 B1 * | 5/2007 | | B03C 3/08 |
| KR | 20110123542 A * | 5/2010 | | B03C 3/41 |
| KR | WO 2013065906 A1 * | 5/2013 | | B03C 3/41 |
| WO | 2013065906 A1 | 5/2013 | | |

* cited by examiner

ELECTRIC DUST COLLECTING DEVICE AND AIR CONDITIONER HAVING THE SAME

CROSS-REFERENCE TO RELATED APPLICATION

This application claims the priority benefit of Korean Patent Application No. 10-2014-0079208, filed on Jun. 26, 2014 in the Korean Intellectual Property Office, the disclosure of which is incorporated herein by reference.

BACKGROUND

1. Field of the Disclosure

The present invention relates to an electric dust collecting device and an air conditioner having the same, and more particularly to an electric dust collecting device and an air conditioner having the same in which a first filter unit and a second filter unit are sequentially disposed in an air flow direction.

2. Description of the Related Art

Typically, an electric dust collecting device is mounted in an air conditioner such as an air cleaner, a cooling apparatus and a heating apparatus to electrically charge and collect pollutants such as dust entrained in air.

The electric dust collecting device may include an electric charging unit for generating an electric field, and a dust collecting unit for collecting dust particles electrically charged by the electric charging unit. In use, after passing through the electric charging unit, dust entrained in air may be collected at the dust collecting unit while the air passes through the dust collecting unit.

The electric charging unit may include discharge electrodes, and counter electrodes disposed parallel to the discharge electrodes. Dust entrained in air may be collected by corona discharge occurring between the discharge electrodes and the counter electrodes which face each other.

With continuous use of the electric dust collecting device, pollutants may increasingly accumulate at the electric dust collecting unit. Accordingly, as servicing such as washing of the electric dust collecting unit is facilitated, convenience in use is improved.

SUMMARY

Therefore, the present invention has been made in view of the above problems, and it is an object of the present invention to provide an electric dust collecting device having a simplified structure and an enhanced collection rate for contaminated dust at the same surface area, and an air conditioner having the same.

In accordance with an aspect of the present invention, the above and other objects can be accomplished by the provision of an electric dust collecting device including a first filter unit including a plurality of discharge electrode plates which are spaced apart from each other and have spaces defined therebetween, a high voltage generator electrically connected to all of the plurality of discharge electrode plates, and a second filter unit disposed downstream of the first filter unit in an air flow direction and connected to a ground to cause corona discharge between the discharge electrode plates and the second filter unit, whereby particles electrically charged by corona discharge are collected at the second filter unit.

In accordance with another aspect of the present invention, the above and other objects can be accomplished by the provision of an air conditioner including an electric dust collecting device for electrically charging dust in air and collecting the charged dust, and a blower for blowing air toward the electric dust collecting device, wherein the electric dust collecting device includes a first filter unit including a plurality of discharge electrode plates which are spaced apart from each other and have spaces defined therebetween, a high voltage generator electrically connected to all of the plurality of discharge electrode plates, and a second filter unit disposed downstream of the first filter unit in a flow direction of air blown by the blower and connected to a ground to cause corona discharge between the discharge electrode plates and the second filter unit, whereby particles electrically charged by corona discharge are collected at the second filter unit.

The second filter unit may have a front end spaced apart from a rear end of the first filter unit in an air flow direction.

The second filter unit may be disposed to be elongated in a direction parallel to a direction along which the plurality of discharge electrode plates are arranged.

The second filter unit may include a metal mesh connected to the ground.

The second filter unit may include a plurality of earth electrode plates spaced apart from each other.

A first spacing between adjacent ones of the plurality of earth electrode plates may be smaller than a second spacing between adjacent ones of the plurality of discharge electrode plates.

The number of the plurality of earth electrode plates may be greater than that of the plurality of discharge electrode plates.

At least one of the plurality of earth electrode plates may have a front end directed toward a corresponding one of the spaces in an air flow direction.

The plurality of earth electrode plates may be arranged in a direction parallel to a direction along which the plurality of discharge electrode plates are arranged.

The air conditioner may further include a first earth line connected to the second filter unit, a first earth terminal connected to the first earth line, a second earth line connected to the ground, and a second earth terminal connected to the second earth line and adapted to contact the first earth terminal and to be disconnected from the first earth terminal.

Adjacent ones of the plurality of discharge electrode plates may face each other.

Adjacent ones of the plurality of earth electrode plates may face each other.

The air conditioner may further include a first filter case in which the plurality of discharge electrode plates are installed, wherein the first filter case may include a second filter unit attachment on which the second filter unit is mounted.

The air conditioner may further include an earth line connected to an earth terminal which contacts the second filter unit and which is disconnected from the second filter unit, wherein the earth terminal may be disposed at the second filter unit attachment.

The second filter unit may include a plurality of earth electrode plates disposed spaced apart from each other, wherein the electric dust collecting device may include a second filter case in which the plurality of earth electrode plates are installed.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE EMBODIMENTS

Reference will now be made in detail to the preferred embodiments of the present invention which is designed to achieve the above object, examples of which are illustrated in the accompanying drawings. In explanation of the preferred embodiments, the same reference numbers will be used throughout the drawings to refer to the same or like parts, and redundant descriptions thereof are omitted.

Figure 1:
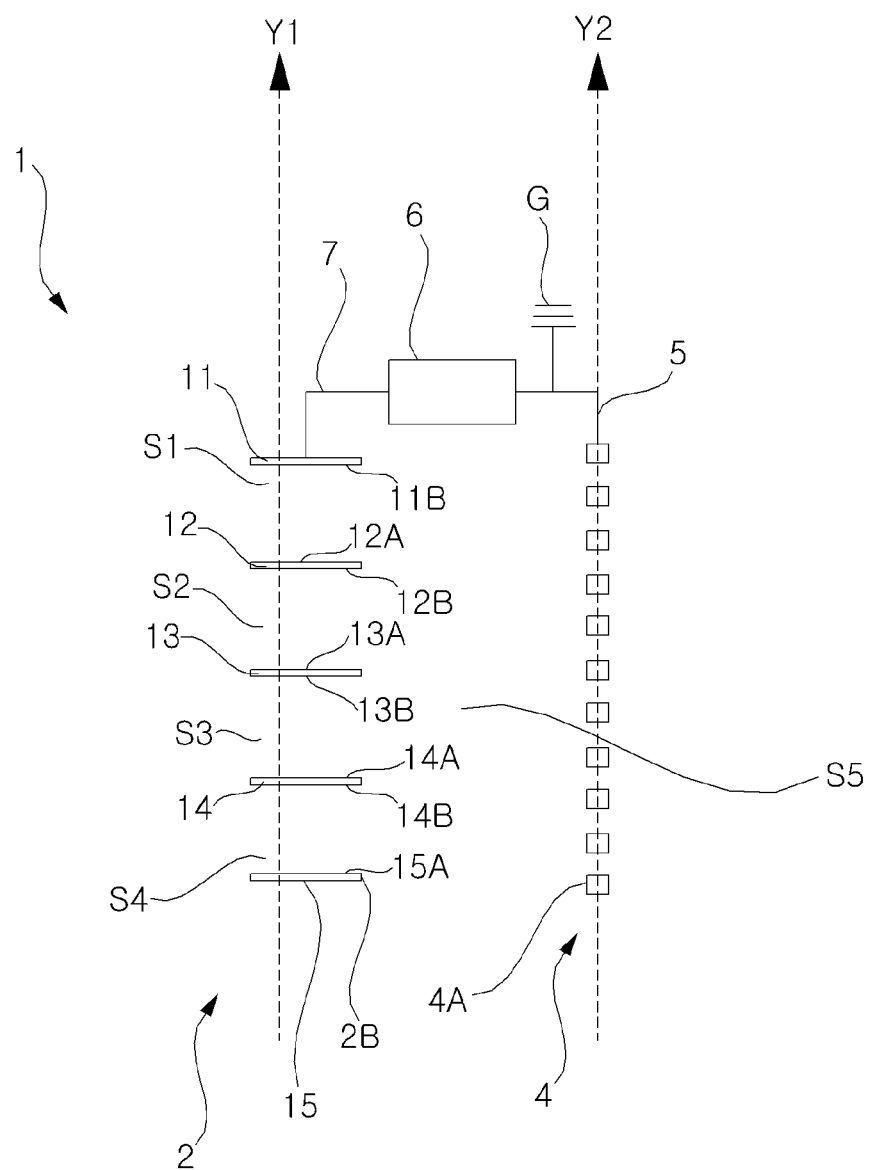
FIG. 1 is a view showing substantial components of a first embodiment of an electric dust collecting device according to the present invention.
Figure 2:
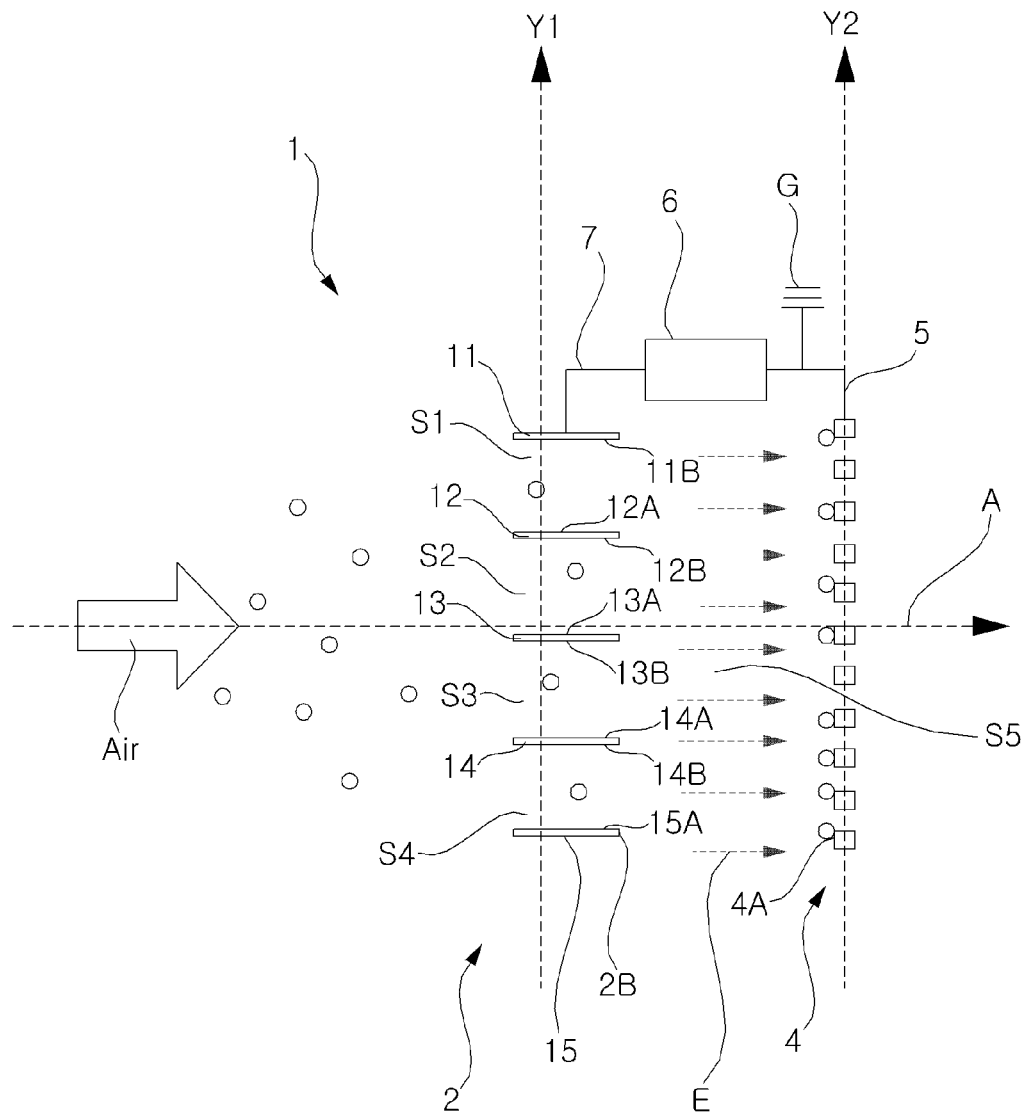
FIG. 2 is a view showing the first embodiment of the electric dust collecting device according to the present invention which is collecting dust in operation.
Figure 3:
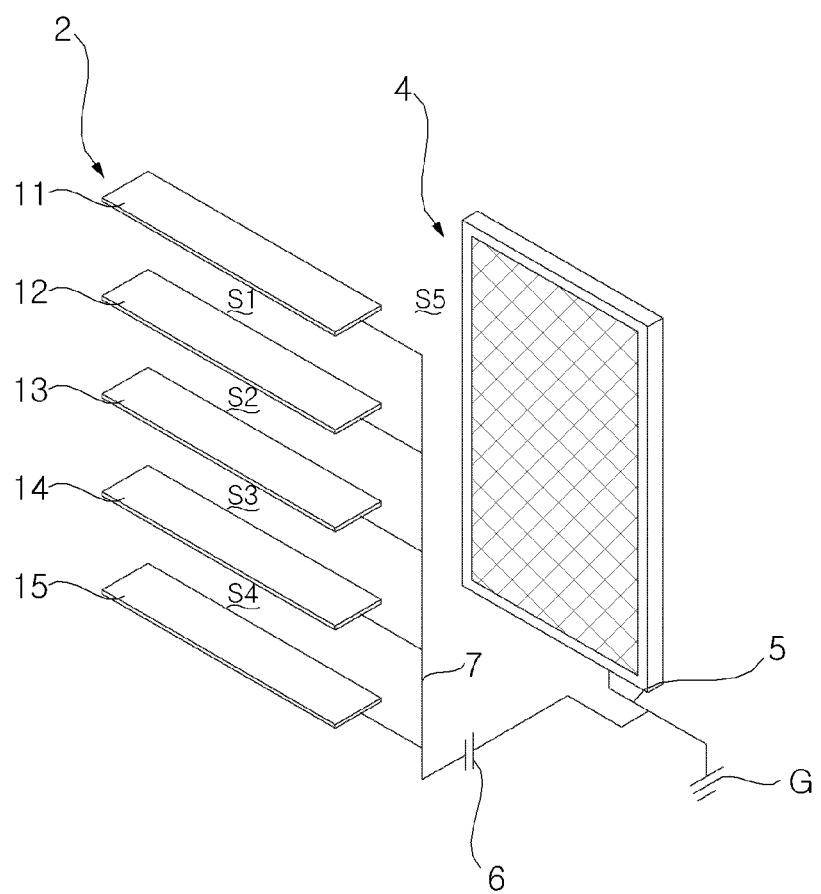
FIG. 3 is a perspective view showing substantial components of the first embodiment of the electric dust collecting device according to the present invention.
Figure 4:
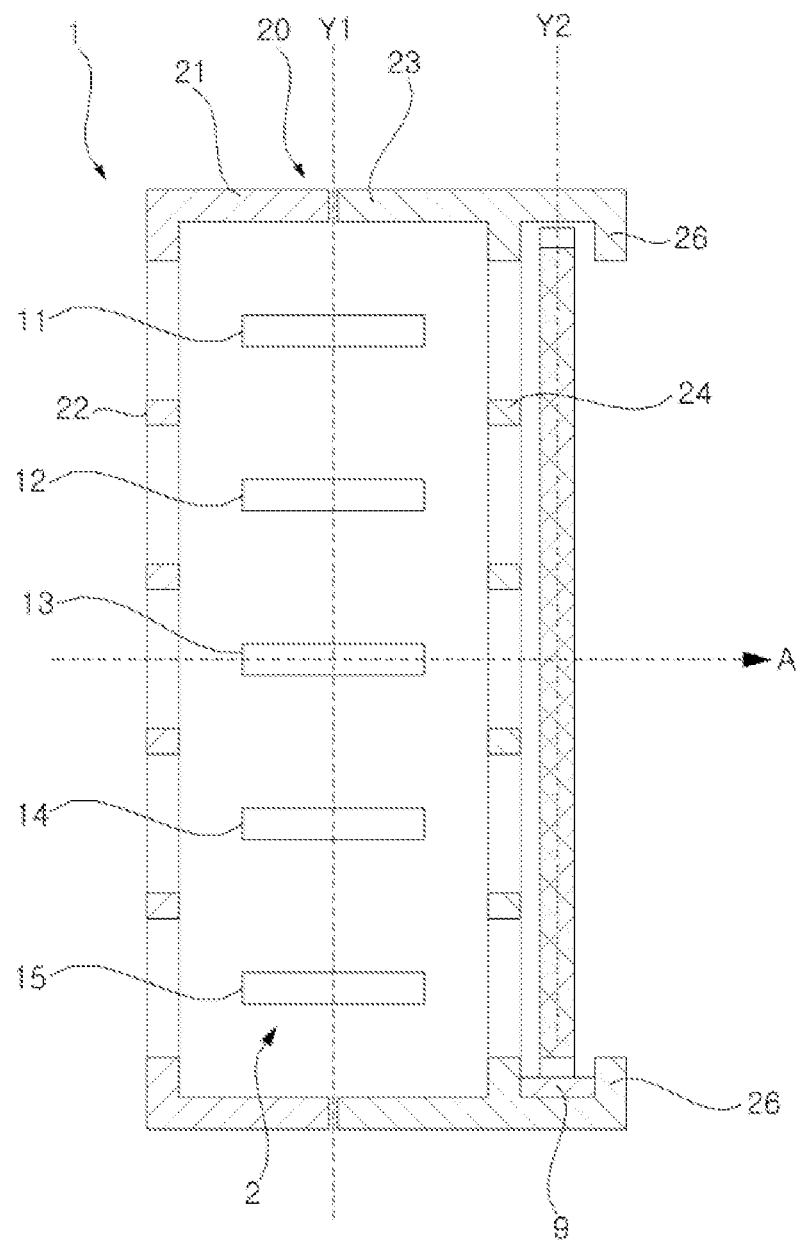
FIG. 4 is a cross-sectional view showing the first embodiment of the electric dust collecting device according to the present invention.

FIG. 1 is a view showing substantial components of a first embodiment of an electric dust collecting device according to the present invention. FIG. 2 is a view showing the first embodiment of the electric dust collecting device according to the present invention which is collecting dust in operation. FIG. 3 is a perspective view showing substantial components of the first embodiment of the electric dust collecting device according to the present invention. FIG. 4 is a cross-sectional view showing the first embodiment of the electric dust collecting device according to the present invention.

The electric dust collecting device 1 may collect dust entrained in air by electrically charging the dust. The electric dust collecting device 1 may include a first filter unit 2, and a second filter unit 4 disposed downstream of the first filter unit 2 in an air flow direction. The electric dust collecting device may further include a high voltage generator electrically connected to the first filter unit 2. The second filter unit 4 may be connected to the ground G.

The first filter unit 2 may be embodied as a discharge electrode filter unit including a plurality of discharge electrode plates 11-15, and the second filter unit 4 may be embodied as an earth electrode filter unit connected to the ground G.

As shown in FIG. 2, when high voltage is applied to the first filter unit 2 including the plurality of discharge electrode plates 11-15, an electrical field E may be created between the plurality of discharge electrode plates 11-15 and the second filter unit 4, thus causing corona discharge between the first filter unit 2 and the second filter unit 4.

Both the first filter unit 2 and the second filter unit 4 may constitute an electrical charging part for electrically charging dust particles, and the second filter unit 4 alone may constitute a dust collecting part for collecting dust particles.

The plurality of discharge electrode plates 11-15 of the first filter unit 2 may be arranged spaced apart from one another. The first filter unit 2 may include the plurality of discharge electrode plates 11-15 which are arranged spaced apart from each other. Each of the plurality of discharge electrode plates 11-15 may be oriented in an air flow direction A. The plurality of discharge electrode plates 11-15 may be spaced apart from each other in the direction Y1 perpendicular to the air flow direction A. The plurality of discharge electrode plates 11-15 of the first filter unit 2 may have spaces S1-S4 defined therebetween. The spaces S1-S4 may serve as channels through which air flows. The plurality of discharge electrode plates 11-15 of the first filter unit 2 may define dispersion channels for dispersing air. The first filter unit 2 may not have additional counter electrodes (earth electrodes) disposed between the plurality of discharge electrode plates 11-15. In this case, the first filter unit 2 may accommodate more discharge electrode plates 11-15 in the same volume than when having the additional counter electrodes (i.e., earth electrode) disposed between the plurality of discharge electrode plates 11-15.

When the entire first filter unit 2 occupies the same surface area, the first filter unit 2, which is provided with the plurality of discharge electrode plates 11-15 without additional counter electrodes, may accommodate more discharge electrode plates 11-15 than when including the additional counter electrodes (not shown) as well as the plurality of discharge electrode plates 11-15 which are alternately arranged. Since the plurality of discharge electrode plates 11-15 do not have the counter electrodes disposed therebetween, the plurality of discharge electrode plates 11-15 may directly face each other. In other words, adjacent electrode plates of the plurality of discharge electrode plates 11-15 may face each other.

Although the number of the plurality of discharge electrode plates 11-15 is not limited, an embodiment in which the first filter unit 2 is constituted by five discharge electrode plates 11-15 and the five discharge electrode plates are horizontally disposed to be parallel to each other is illustrated by way of example for simplicity of explanation.

The uppermost one 11 of the plurality of discharge electrode plates 11-15 may have a lower surface 11B facing an upper surface 12A of the second discharge electrode plate disposed closest to and below the first discharge electrode plate 11. Without provision of an additional counter electrode between the lower surface 11B of the first discharge electrode plate 11 and the upper surface 12A of the second discharge electrode plate 12, a first space S1 may be defined therebetween so as to allow air to flow therethrough.

Furthermore, a lower surface 12B of the second discharge electrode plate 12 may face an upper surface 13A of a third discharge electrode plate 13 disposed closest to and below the second discharge electrode plate 12. Without provision of an additional counter electrode between the lower surface 12B of the second discharge electrode plate 12 and the upper surface 13A of the third discharge electrode plate 13, a second space S2 may be defined therebetween so as to allow air to flow therethrough.

In addition, a lower surface 13B of the third discharge electrode plate 13 may face an upper surface 14A of a fourth discharge electrode plate 14 disposed closest to and below the third discharge electrode plate 13. Without provision of an additional counter electrode between the lower surface 13B of the third discharge electrode plate 13 and the upper surface 14A of the fourth discharge electrode plate 14, a third space S3 may be defined therebetween so as to allow air to flow therethrough.

Furthermore, a lower surface 14B of the fourth discharge electrode plate 14 may face an upper surface 15A of a fifth discharge electrode plate 15 disposed closest to and below the fourth discharge electrode plate 14. Without provision of an additional counter electrode between the lower surface 14B of the fourth discharge electrode plate 14 and the upper surface 15A of the fifth discharge electrode plate 15, a fourth space S4 may be defined therebetween so as to allow air to flow therethrough.

Each of the plurality of discharge electrode plates 11-15 may be electrically connected to the high voltage generator 6, and the first filter unit 2 may include the plurality of discharge electrode plates 11-15 to which a high voltage is applied without provision of additional counter electrodes (earth electrodes).

As shown in FIG. 4, the electric dust collecting device 1 may include a first filter case 20 which is provided together with the plurality of discharge electrode plates 11-15. The plurality of discharge electrode plates 11-15 may be disposed in the first filter case 20 serving to protect the plurality of discharge electrode plates 11-15. In other words, the first filter case 20 may serve as a discharge electrode plate case for protecting the plurality of discharge electrode plates 11-15.

The first filter case 20 may include one or more case members 21 and 23. The case members 21 and 23 may include a first inflow case member 21 at which a grille 22 is formed to allow air to pass therethrough. Air may pass through the grille 22 of the first inflow case member 21 and then may flow toward the plurality of discharge electrode plates 11-15. The case members 21 and 23 may further include a first outflow case member 23 at which a grilles 24 is formed to allow the air having passed through the plurality of discharge electrode plates 11-15 to be discharged therethrough. Air having passing through the spaces between the plurality of discharge electrode plates 11-15 may pass through the grille 24 of the first outflow case member 23 and then may be discharged from the first outflow case member 23 through the grille 24.

As shown in FIG. 2, the second filter unit 4 may be disposed downstream of the first filter unit 2 in an air flow direction A. The second filter unit 4 may be connected to the ground G to cause corona discharge between the second filter unit 4 and the plurality of discharge electrode plates 11-15. As a result, dust particles which are electrically charged by corona discharge may be collected. When high voltage from the high voltage generator 6 is applied to the plurality of discharge electrode plates 11-15, corona discharge may occur between the plurality of discharge electrode plates 11-15 and the second filter unit 4, and thus particles in the air may be electrically charged by corona discharge. The charged particles adhere to the second filter unit 4 connected to the ground G.

A front end 4A of the second filter unit 4 may be spaced apart from a rear end 2B of the first filter unit 2 in the air flow direction A.

The second filter unit 4 may be configured to be elongated in the direction Y2 parallel to the direction Y1 in which the plurality of discharge electrode plates 11-15 are arranged. The number of the second filter unit 4 may be smaller than that of the plurality of discharge electrode plates 11-15.

The second filter unit 4 may be constituted by a metal mesh. The second filter unit 4 may be constructed to be detached from an earth line 5. The electric dust collection device 1 may constructed such that high voltage is applied only to the first filter unit 2 among the first and second filter units 2 and 4, and pollutants are collected only at the second filter unit 4 among the first and second filter units 2 and 4. Upon servicing the electric dust collecting device 1, a worker such as a user may separate only the second filter unit 4 for washing or service thereof.

When the second filter unit 4 is constituted by the metal mesh, a worker may conveniently separate the metal mesh constituting the second filter unit 4 for service thereof. The second filter unit 4 may be installed to be spaced apart from the first filter case 20 and may be mounted on the first filter case 20 of the first filter unit 2.

The first filter case 20 may be provided with a second filter unit attachment 26 for enabling the second filter unit 4 to be detachably mounted on the first filter case 20. The earth line 5 may be installed at the first filter case 20. When the first filter case 20 includes both the first inflow case member 21 and the first outflow case member 23, the second filter unit attachment 26 may be formed at the first outflow case member 23. The earth line 5 may be installed at the first outflow case member 23. The second filter unit attachment 26 may be constituted by a sliding guide formed at the first outflow case member 23 to enable the second filter unit 4 to be detachably mounted on the first outflow case member 23 in a sliding manner. Furthermore, the second filter unit attachment 26 may also be constituted by hooks formed at the first outflow case member 23 to enable the second filter 4 to be resiliently coupled to the first outflow case member 23. The second filter unit 4 may be connected to the earth line 5 when being attached to the second filter unit attachment 26, and may be disconnected from the earth line 5 when separated from the second filter unit attachment 26. As shown in FIG. 4, the earth line 5 may be connected to an earth terminal 9 so as to allow the second filter unit 4 to contact the earth terminal 9 or to be separated therefrom. The earth terminal may be configured into a planar structure capable of contacting the second filter unit 4 in a surface contact manner upon attachment of the second filter unit 4. The earth terminal 9 may be disposed at the second filter unit attachment 26.

The high voltage generator 6 may be connected to all of the plurality of discharge electrode plates 11-15 to apply high voltage to all of the plurality of discharge electrode plates 11-15. The high voltage generator 6 may be connected to the plurality of discharge electrode plates 11-15 through a high voltage applying line 7. The high voltage applying line 7 may always contact the plurality of discharge electrode plates 11-15.

Operation of this embodiment is now described.

When the second filter unit 4 is attached to the second filter unit attachment 26, the second filter unit 4 may be connected to the earth line 5. When the high voltage generator 6 is activated with the second filter unit 4 being grounded, the high voltage generator 6 may apply high voltage to all of the plurality of discharge electrode plates 11-15 of the first filter unit 2.

When high voltage is applied to all of the plurality of discharge electrode plates 11-15, corona discharge may occur between all of the plurality of discharge electrode plates 11-15 and the second filter unit 4.

Air may flow toward the first filter unit 2, and then may be dispersed while passing through the spaces S1-S4 defined between the plurality of discharge electrode plates 11-15. Dust, which is entrained in the air having passed through the spaces S1-S4, may be electrically charged by corona discharge in a space S5 between the plurality of discharge electrode plates 11-15 and the second filter unit 4. The dust, which has been charged in the space S5 between the plurality of discharge electrode plates 11-15 and the second filter unit 4, may flow toward the second filter unit 4, and then may adhere to the second filter unit 4 connected to the ground with the result that the dust is collected at the second filter unit 4.

Figure 5:
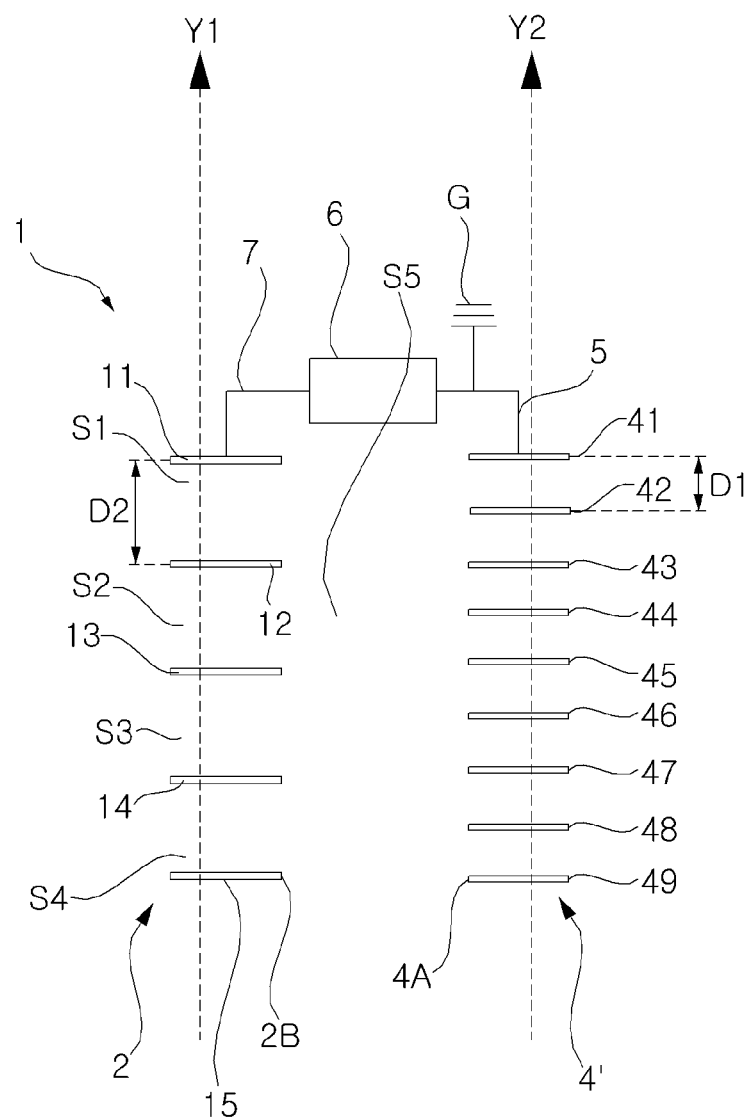
FIG. 5 is a view showing substantial components of a second embodiment of an electric dust collecting device according to the present invention.
Figure 6:
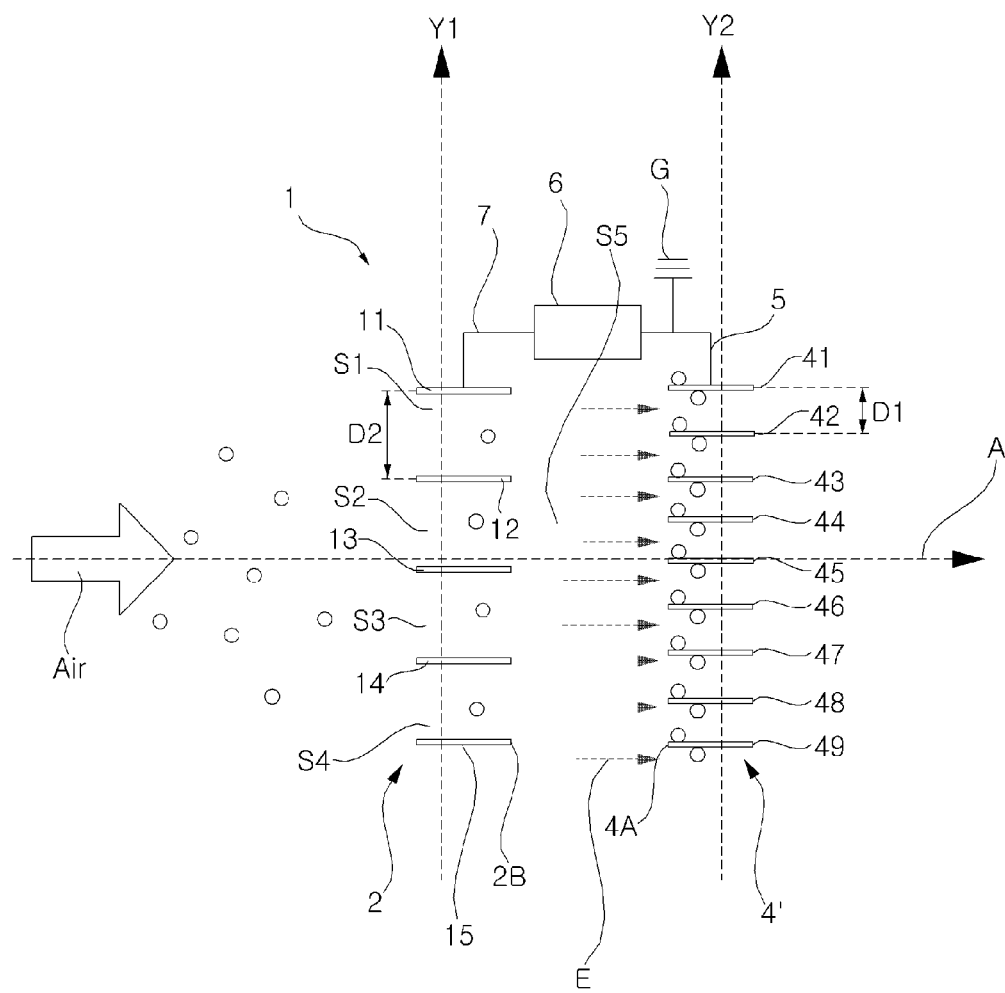
FIG. 6 is a view showing the second embodiment of the electric dust collecting device according to the present invention which is collecting dust in operation.
Figure 7:
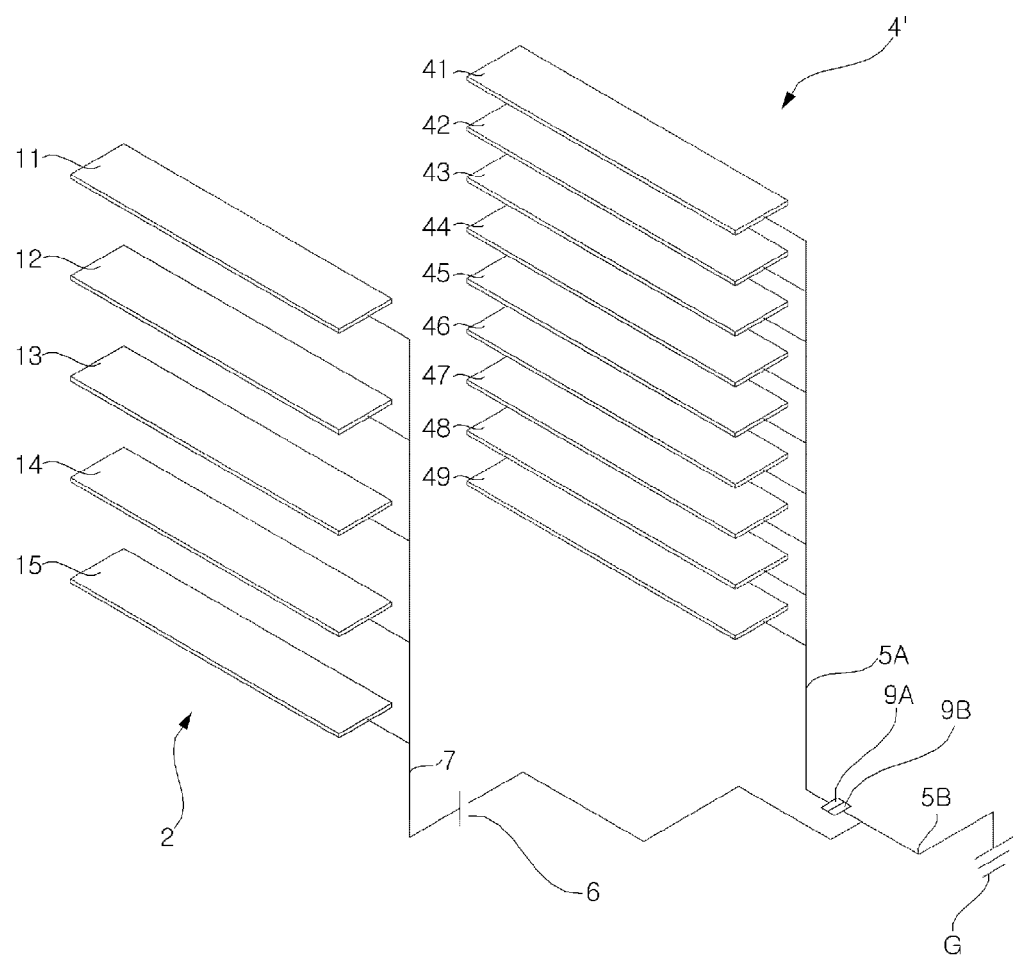
FIG. 7 is a perspective view showing substantial components of the second embodiment of the electric dust collecting device according to the present invention.
Figure 8:
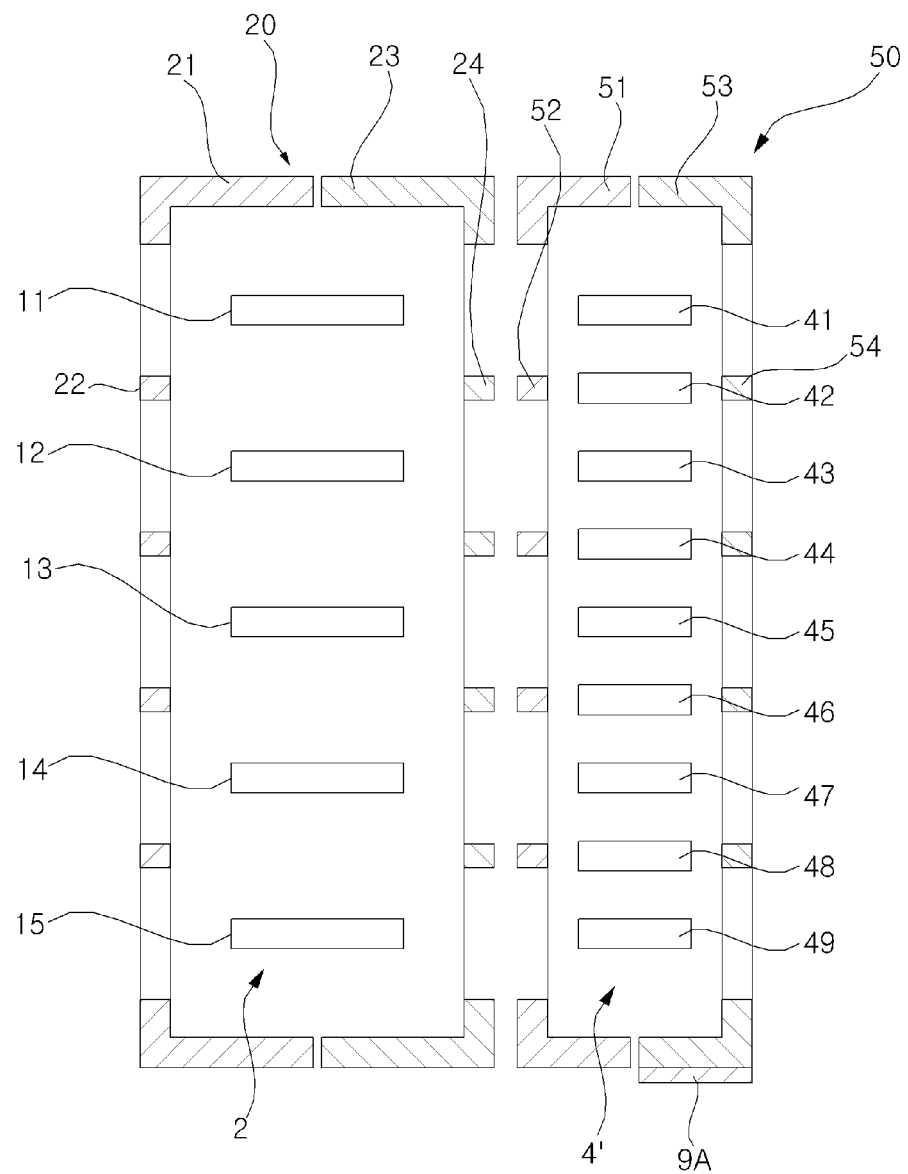
FIG. 8 is a cross-sectional view showing the second embodiment of the electric dust collecting device according to the present invention.

FIG. 5 is a view showing substantial components of a second embodiment of an electric dust collecting device according to the present invention. FIG. 6 is a view showing the second embodiment of the electric dust collecting device according to the present invention which is collecting dust in operation. FIG. 7 is a perspective view showing substantial components of the second embodiment of the electric dust collecting device according to the present invention. FIG. 8 is a cross-sectional view showing the second embodiment of the electric dust collecting device according to the present invention.

A second filter unit 4' of the second embodiment may include a plurality of earth electrode plates 41-49 which are spaced apart from each other. Since the constructions and operations of components other than the second filter unit 4' are identical or similar to those of the first embodiment, the same reference numbers will be used throughout the drawings, and redundant descriptions thereof are omitted.

The second filter unit 4' may be positioned downstream of the first filter unit 2 in an air flow direction A, and a front end 4A of the second filter unit 4' may be spaced apart from a rear end 2B of the first filter unit 2 in the air flow direction A.

The second filter unit 4' may have spaces defined between the plurality of earth electrode plates 41-49. Adjacent ones of the plurality of earth electrode plates 41-49 may face each other. The plurality of earth electrode plates 41-49 may be positioned parallel to each other. A lower surface of one of the plurality of earth electrode plates 41-49 may face an upper surface of another adjacent earth electrode plate disposed below the one earth electrode plate. The plurality of earth electrode plates 41-49 may be positioned parallel to the air flow direction A.

A first spacing D1 between two adjacent ones of the plurality of earth electrode plates 41-49 may be smaller than a second spacing D2 between two adjacent ones of the plurality of discharge electrode plates 11-15. The number of the plurality of earth electrode plates 41-49 may be larger than that of the plurality of discharge electrode plates 11-15.

The second filter unit 4' may include one or more earth electrode plates 42, 44, 46 and 48 which have front ends directed toward the spaces S1-S4 defined in the first filter unit 2 in the air flow direction A.

The plurality of earth electrode plates 41-49 may be disposed parallel to the plurality of discharge electrode plates 11-15 in the air flow direction A. The plurality of discharge electrode plates 11-15 may be disposed parallel to the air flow direction A, and the plurality of earth electrode plates 41-49 may also be disposed parallel to the air flow direction A.

The plurality of earth electrode plates 41-49 may be spaced apart from each other in the direction Y2 perpendicular to the air flow direction A in the same fashion as the plurality of discharge electrode plates 11-15.

The plurality of earth electrode plates 41-49 may be spaced apart from each other in the direction Y2 parallel to the spacing direction along which the plurality of discharge electrode plates 11-15 are spaced apart from each other.

The electric dust collecting device may include a second filter case 50. The second filter case 50 may include the plurality of earth electrode plates 41-49. The plurality of earth electrode plates 41-49 may be installed in the second filter case 50. The second filter case 50 may protect the plurality of earth electrode plates 41-49. The second filter case 50 may serve as an earth electrode plate case for protecting the plurality of earth electrode plates 41-49.

The second filter case 50 may include one or more case members 51 and 53. The case members 51 and 53 may include a second inflow case member 51 at which a grille 52 is formed so as to allow air to pass therethrough. Air may pass through the grille 52 of the second inflow case member 51 and then may flow toward the plurality of earth electrode plates 41-49. The case members 51 and 53 may further include a second outflow case member 53 at which a grille 54 is formed such that the air having passed the plurality of earth electrode plates 41-49 is discharged therethrough. Air may pass through the plurality of earth electrode plates 41-49 and then may be discharged from the second filter case 50 through the grille 54 of the second outflow case member 53.

The second filter unit 4' may be configured to be detachably coupled the earth line 5. The electric dust collecting device may be constructed such that only the second filter unit 4' among the first filter unit 2 and the second filter unit 4' may collect pollutants and thus a worker such as a user may separate only the second filter unit 4' for washing or service thereof. The second filter unit 4' may be connected to a first earth line 5A. The first earth line 5A may be connected to all of the plurality of earth electrode plates 41-49. The electric dust collecting device may further include a second earth line 5B connected to the ground G. The first earth line 5A and the second earth line 5B may be connected to each other and separated from each other. The first earth line 5A may be installed at the second filter case 50. The second earth line 5B may be disposed outside the second filter case 50.

The second filter case 50 may be detachably mounted on the first filter case 20, or may be detachably mounted on a filter guide (not shown and described later) other than the first filter case 20.

When the second filter case 50 is detachably mounted on the first outflow case member 23, the first outflow case member 23 may be provided with the second filter case attachment (not shown) on which the second filter case 50 is mounted. In this case, the second earth line 5B may be coupled to the second filter case attachment. The second filter case attachment may be constituted by a sliding guide formed at the first outflow case member 23 such that the second filter case 50 may be detachably mounted on the first outflow case member 23 in a sliding manner. The second filter case attachment may be constituted by hooks formed at the first outflow case member 23 such that the second filter case 50 is resiliently coupled to the first outflow case member 23. The first earth line 5A and the second earth line 5B may be connected to each other when the second filter case 50 is mounted on the second filter unit attachment, and may be disconnected from each other when the second filter case 50 is separated from the second filter unit attachment. The second earth line 5B may be connected to the first earth terminal 9A, and the second earth line 5B may be connected to the second earth terminal 9B which contacts the first earth terminal 9A and is disconnected from the first earth terminal 9A.

Operation of the second embodiment will now described.

When high voltage is applied to all of the plurality of discharge electrode plates 11-15, corona discharge may occur between the plurality of discharge electrode plates 11-15 and the plurality of earth electrode plates 41-49.

Upon activation of the high voltage generator 6, air may flow toward the first filter unit 2. The air may be dispersed while passing through the plurality of spaces S1-S4 defined between the plurality of discharge electrode plates 11-15. Dust entrained in the air having passed through the plurality of spaces S1-S4 may be electrically charged by corona discharge occurring between the plurality of discharge electrode plates 11-15 and the plurality of earth electrode plates 41-49.

The dust particles, which are electrically charged between the plurality of discharge electrode plates 11-15 and the plurality of earth electrode plates 41-49, may flow toward the plurality of earth electrode plates 41-49. Then the dust particles may adhere to the plurality of earth electrode plates 41-49 connected to the ground, thus collecting the dust particles at the plurality of earth electrode plates 41-49.

Figure 9:
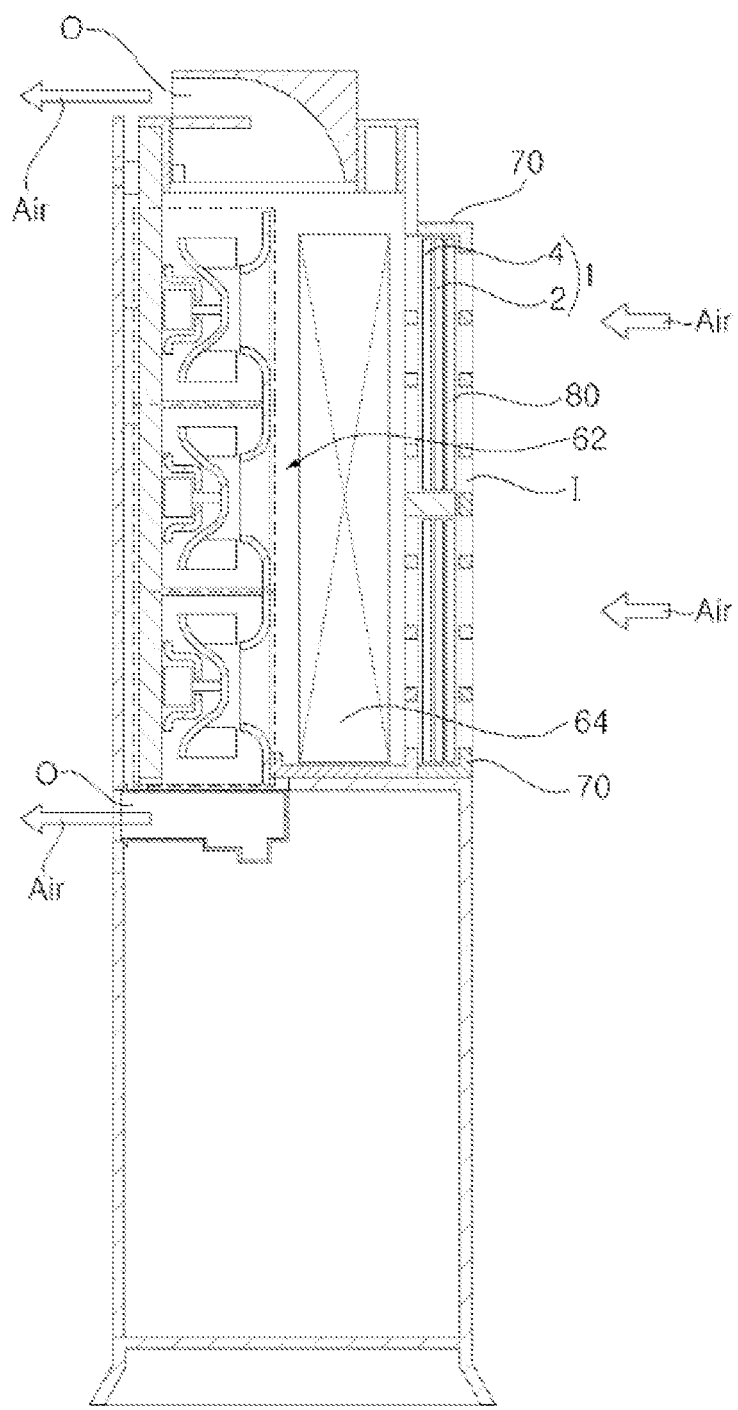
FIG. 9 is a view showing an embodiment of an air conditioner having the electric dust collecting device, according to the present invention.

FIG. 9 is a view showing an embodiment of an air conditioner having the electric dust collecting device according to the present invention.

The air conditioner having the electric dust collecting device may include a blower 62 for blowing air to the electric dust collecting device 1. The blower 62 may cause indoor air to flow through the first filter unit 2 and the second filter unit 4 in this order.

The air conditioner may include an air inlet I through which indoor air is inhaled, and an air outlet O through which air conditioned in the air conditioner is discharged to an indoor space.

When the air conditioner is embodied as an air cleaning device for cleaning air, the air cleaning device may include the electric dust collecting device and the blower 62. When the air conditioner is embodied as an air cleaning and cooling apparatus for performing both cleaning of air and cooling of an indoor space, the air cleaning and cooling apparatus may further include a heat exchanger 64 for exchanging heat between refrigerant and air in addition to the electric dust collecting device 1 and the blower 62. When the air conditioner is embodied as an air cleaning and heating apparatus for performing both cleaning of air and heating of an indoor space, the air cleaning and heating apparatus may further include at least one of the heat exchanger 64 for exchanging heat between refrigerant and air and a heater (not shown) for generating heat by electric power to heat air in addition to the electric dust collecting device 1 and the blower 62.

The air conditioner may further include a filter guide 70 having the air inlet I formed thereat and on which the electric dust collecting device 1 is detachably mounted. The filter guide 70 may be provided with the first filter case attachment on which the first filter case 20 of the first and second embodiments of the electric dust collecting device according to the present invention is mounted. The first filter case 20 may be mounted on and separated from the filter guide 70. Furthermore, the filter guide 70 may be provided with the second filter base attachment on which the second filter case 20 of the second embodiment of the present invention is detachably mounted. The second filter case 50 may be mounted on and separated from the filter guide 70.

The second filter unit 4 of the first embodiment of the present invention may be mounted on and separated from the filter guide 70 of the air conditioner instead of being detachably mounted on the first filter case 20.

The air inlet I, the first filter unit 2, the second filter unit 4, the blower 62 and the air outlet O may be installed at the air conditioner in this order in the air flow direction A. The air conditioner may inhale outside air to clean the air and then may discharge the cleaned air to an indoor space.

The air conditioner may further include a prefilter 80 which is disposed before the first filter unit 2 in the air flow direction A.

Upon activation of the blower 62 of the air conditioner, the high voltage generator 6 may be turned on and the electric dust collecting device 1 may electrically charge dust entrained in air blown by the blower 62, thus collecting the dust.

As is apparent from the above description, since corona discharge occurs between the plurality of discharge electrode plates of the first filter unit and the second filter unit disposed downstream of the first filter unit in an air flow direction, there is no need to provide the first filter unit with counter electrode plates facing the discharge electrode plates and disposed parallel to the discharge electrode plates, and the first filter unit has a simplified structure.

Furthermore, since the number of the discharge electrode plates constituting the first filter unit can be maximized, an electrical charging rate attained from the first filter unit having the same surface area can be enhanced and air cleaning effect can be enhanced.

In addition, since the number of the earth electrode plates constituting the second filter unit can be maximized, a surface area capable of collecting dust can be maximized and air cleaning effect can be enhanced.

Furthermore, since only the second filter unit at which dust is collected can be removed and cleaned, a cleaning operation is facilitated and convenience in use can be improved.

Although the preferred embodiments of the present invention have been disclosed for illustrative purposes, those skilled in the art will appreciate that various modifications, additions and substitutions are possible without departing from the scope and spirit of the invention as disclosed in the accompanying claims.

What is claimed is:

1. An electric dust collecting device comprising:
   a first filter unit including a plurality of discharge electrode plates which are spaced apart from each other and have spaces defined therebetween;
   a high voltage generator electrically connected to all of the plurality of discharge electrode plates;
   a second filter unit disposed downstream of the first filter unit in an air flow direction and connected to a ground to cause corona discharge between the plurality of discharge electrode plates and the second filter unit, whereby particles electrically charged by corona discharge are collected at the second filter unit;
   a first earth line connected to the second filter unit;
   a first earth terminal connected to the first earth line;
   a second earth line connected to the ground; and
   a second earth terminal connected to the second earth line,
   wherein the electric dust collecting device further comprises a filter case in which the plurality of discharge electrode plates is installed,
   wherein the filter case includes a second filter unit attachment on which the second filter unit is detachably mounted, wherein the second filter unit attachment is constituted by a sliding guide such that the second filter unit is detachably mountable on the filter case in a sliding manner, wherein the second earth terminal is disposed at the second filter unit attachment, wherein the second earth terminal is configured into a planar structure to contact the first earth terminal in a surface contact manner.

2. The electric dust collecting device according to claim 1, wherein the second filter unit has a front end spaced apart from a rear end of the first filter unit, wherein the front end of the second filter unit is disposed downstream of the rear end of the first filter unit in an air flow direction.

3. The electric dust collecting device according to claim 1, wherein the second filter unit is elongated in a direction parallel to a direction along which the plurality of discharge electrode plates are arranged.

4. The electric dust collecting device according to claim 1, wherein the second filter unit includes a metal mesh.

5. The electric dust collecting device according to claim 1, wherein the second filter unit includes a plurality of earth electrode plates spaced apart from each other.

6. The electric dust collecting device according to claim 5, wherein a first spacing between adjacent ones of the plurality of earth electrode plates is smaller than a second spacing between adjacent ones of the plurality of discharge electrode plates.

7. The electric dust collecting device according to claim 5, wherein the number of the plurality of earth electrode plates is greater than that of the plurality of discharge electrode plates.

8. The electric dust collecting device according to claim 5, wherein at least one of the plurality of earth electrode plates has a front end directed toward a corresponding one of the spaces defined between the plurality of discharge electrode plates in a direction that is parallel to the air flow direction.

9. The electric dust collecting device according to claim 5, wherein the plurality of earth electrode plates are arranged in a direction parallel to a direction along which the plurality of discharge electrode plates are arranged.

10. An air conditioner comprising:
an electric dust collecting device for electrically charging dust in air and collecting the charged dust; and
a blower for blowing air toward the electric dust collecting device,
wherein the electric dust collecting device comprises:
a first filter unit including a plurality of discharge electrode plates which are spaced apart from each other and have spaces defined therebetween;
a high voltage generator electrically connected to all of the plurality of discharge electrode plates;
a second filter unit disposed downstream of the first filter unit in a flow direction of air blown by the blower and connected to a ground to cause corona discharge between the plurality of discharge electrode plates and the second filter unit, whereby particles electrically charged by corona discharge are collected at the second filter unit;
a first earth line connected to the second filter unit;
a first earth terminal connected to the first earth line;
a second earth line connected to the ground; and
a second earth terminal connected to the second earth line,
wherein the electric dust collecting device further comprises a filter case in which the plurality of discharge electrode plates is installed,
wherein the filter case includes a second filter unit attachment on which the second filter unit is detachably mounted,
wherein the second filter unit attachment is constituted by a sliding guide such that the second filter unit is detachably mountable on the filter case in a sliding manner,
wherein the second earth terminal is disposed at the second filter unit attachment,
wherein the second earth terminal is configured into a planar structure to contact the first earth terminal in a surface contact manner.

11. The air conditioner according to claim 10, wherein the second filter unit has a front end spaced apart from a rear end of the first filter unit, wherein the front end of the second filter unit is disposed downstream of the rear end of the first filter unit in an air flow direction.

12. The air conditioner according to claim 10, wherein the second filter unit is elongated in a direction parallel to a direction along which the plurality of discharge electrode plates are arranged.

13. The air conditioner according to claim 10, wherein the second filter unit includes a metal mesh connected to the ground.

14. The air conditioner according to claim 10, wherein the second filter unit includes a plurality of earth electrode plates spaced apart from each other.

15. The air conditioner according to claim 14, wherein a first spacing between adjacent ones of the plurality of earth electrode plates is smaller than a second spacing between adjacent ones of the plurality of discharge electrode plates.

16. The air conditioner according to claim 14, wherein the number of the plurality of earth electrode plates is greater than that of the plurality of discharge electrode plates.

17. The air conditioner according to claim 14, wherein at least one of the plurality of earth electrode plates has a front end directed toward a corresponding one of the spaces between the plurality of discharge electrode plates in a direction that is parallel to the air flow direction.

18. The air conditioner according to claim 14, wherein the plurality of earth electrode plates are arranged in a direction parallel to a direction along which the plurality of discharge electrode plates are arranged.

19. The air conditioner according to claim 14, wherein adjacent ones of the plurality of discharge electrode plates face each other, and
wherein adjacent ones of the plurality of earth electrode plates face each other.

* * * * *